United States Statutory Invention Registration [19]

[11] Reg. Number: H261

Task

[43] Published: Apr. 7, 1987

[54] OPTICAL ALIGNMENT METHOD FOR BINOCULAR DISPLAYS

[75] Inventor: Harry L. Task, Dayton, Ohio

[73] Assignee: The United States of America as represented by the Secretary of the Air Force, Washington, D.C.

[21] Appl. No.: 738,940

[22] Filed: May 29, 1985

Related U.S. Application Data

[63] Continuation of Ser. No. 441,815, Nov. 11, 1982.

[51] Int. Cl.[4] ..... G01B 11/26; G01B 11/00

[52] U.S. Cl. ..... 356/138; 356/397; 356/139

[58] Field of Search ..... 356/138, 139, 390, 397, 356/127, 136; 350/576, 562

[56] References Cited

U.S. PATENT DOCUMENTS

| | | | |
|---|---|---|---|
| 2,672,786 | 3/1954 | Capstaff | 88/14 |
| 3,031,919 | 5/1962 | Collyer | 88/14 |
| 3,153,112 | 10/1964 | Gluck et al. | 88/14 |
| 3,488,104 | 1/1970 | Doherty | 350/81 |
| 3,506,329 | 4/1970 | Weaver | 350/10 |
| 3,652,167 | 3/1972 | Smith | 356/163 |
| 3,684,384 | 8/1972 | Hojo et al. | 356/172 |
| 3,712,740 | 1/1973 | Hennings | 356/152 |
| 3,718,396 | 2/1973 | Hennings | 355/43 |
| 3,740,147 | 6/1973 | Kallet | 356/96 |
| 3,785,714 | 1/1974 | Hock et al. | 350/15 |
| 4,167,677 | 9/1979 | Suzki | 356/401 |
| 4,170,401 | 10/1979 | Yoder, Jr. et al. | 350/173 |

OTHER PUBLICATIONS

F. A. Jenkins and H. E. White, *Fundamentals of Optics*, McGraw-Hill, Inc., (1957) p. 6.

*Primary Examiner*—Stephen C. Buczinski
*Assistant Examiner*—Linda J. Wallace
*Attorney, Agent, or Firm*—Donald J. Singer; Bobby D. Scearce

[57] ABSTRACT

An optical alignment device for binocular displays is provided which comprises a pair of objective lenses and adjacent lens apertures for receiving the images transmitted along the two optical axes of the binocular display and optical folding means in the form of folding mirrors, right-angle prisms, or the like, disposed along each said optical axis for optically folding said images along a single optical axis, whereby the said images may be focused as a single composite image on an imaging plane.

6 Claims, 1 Drawing Figure

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

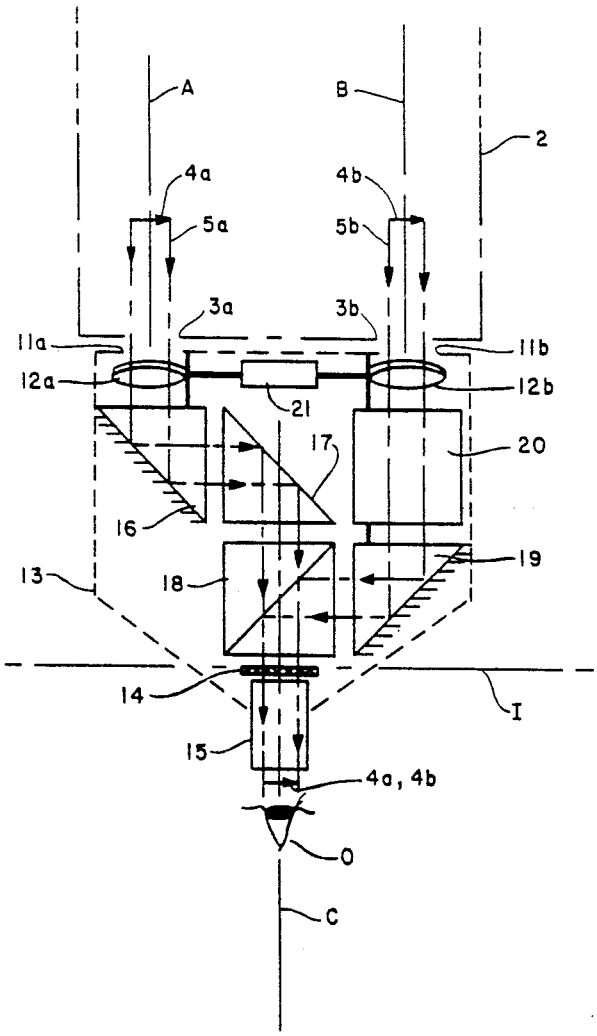
A
B
2
4a
4b
5a
5b
3a
3b
11a
11b
12a
12b
21
17
20
16
19
13
18
14
I
15
4a, 4b
O
C

OPTICAL ALIGNMENT METHOD FOR BINOCULAR DISPLAYS

This is a continuation of application Ser. No. 441,815, filed Nov. 11, 1982.

RIGHTS OF THE GOVERNMENT

The invention described herein may be manufactured and used by or for the Government of the United States for all governmental purposes without the payment of any royalty.

BACKGROUND OF THE INVENTION

This invention relates generally to the field of optical alignment systems and more particularly to a novel optical device for detecting misalignment in a binocular display by superimposition of the two binocular display images.

The present invention provides a simple and easy-to-use device for determining the disparity between the images transmitted along the optical axes of a binocular display system. The invention finds particular utility for the alignment, adjustment or calibration of binocular helmet mounted displays and other optical devices employing wide field of view binocular displays.

The invention comprises a pair of objective lenses for receiving the images transmitted along the two optical axes of the binocular display and focusing the images on an imaging plane for viewing. The images transmitted by the objective lenses are folded onto a single optical axis, using folding mirrors, right angle prisms, or the like, inserted along each optical axis of the binocular system, and displayed on a reticle mounted in the imaging plane as a single superimposed image. Means may be included to provide equal optical path lengths along each binocular optical axis from the lenses to the reticle. For a properly aligned binocular display system, the two images transmitted along the two binocular optical axes and superimposed using the optics of the present invention will appear as a single, well-defined image on the imaging plane. Disparity in alignment of the binocular display between the two optical axes is detected by the device of the present invention as a diffuse or double image.

It is therefore an object of the present invention to provide an improved optical alignment device.

It is a further object of the present invention to provide a device for detecting misalignment of a binocular optical display system.

It is yet another object of the present invention to provide a device for checking the alignment of helmet mounted binocular displays.

These and other objects of the present invention will become apparent as the detailed description of certain representative embodiments thereof proceeds.

SUMMARY OF THE INVENTION

In accordance with the foregoing principles and objects of the present invention, an optical alignment device for binocular displays is provided, which comprises a pair of objective lenses and adjacent lens apertures for receiving the images transmitted along the two optical axes of the binocular display and optical folding means in the form of folding mirrors, right angle prisms, or the like, disposed along each said optical axis for optically folding said images along a single optical axis, whereby the said images may be focused as a single composite image on an imaging plane.

DESCRIPTION OF THE DRAWING

The present invention will be more clearly understood from the following detailed description of certain representative embodiments thereof read in conjunction with the accompanying drawing FIGURE which is a schematic plan view of a representative arrangement of optical components which the invention comprises.

DETAILED DESCRIPTION

Referring now to the accompanying drawing, shown therein is a schematic plan view of a novel binocular alignment/measurement device of the present invention. As shown therein, a pair of objective lens apertures 11*a* and 11*b* and objective lenses 12*a* and 12*b* are configured to be supported near the exit pupils 3*a* and 3*b* of the binocular optical display device 2 requring adjustment, alignment or calibration, and along the optical axes A and B of device 2 substantially as shown. The apertures 11*a* and 11*b* are selected to have openings of about the diameter of the pupil of the eye (about 2 mm to about 8 mm) in order to closely approximate in the alignment device the image conception of an observor O using the binocular optical display device 2 under operational conditions. Apertures 11*a* and 11*b*, lenses 12*a* and 12*b*, along with the remaining optical components hereinafter described which the invention herein includes may be supported in conventional fashion within a housing or other support structure 13.

Objective lenses 12*a* and 12*b* and apertures 11*a* and 11*b* are aligned to receive the images 4*a* and 4*b* of an object under observation as transmitted through display device 2 and represented by light rays 5*a* and 5*b*. The focal lengths of each lens 12*a* and 12*b* are selected in order to focus the images 4*a* and 4*b* on an imaging plane I, on which a calibrated reticle 14 may be mounted, at the focal plane of eyepiece 15 as seen by observer O.

Optical folding means in the form of a pair of folding mirrors or a pair of right-angle prisms 16 and 17 are provided in order to fold image 4*a*, as transmitted by lens 12*a*, along a single optical axis C and through beamsplitter 18 onto the imaging plane of reticle 14 for viewing through eyepiece 15. Image 4*b*, as transmitted by lens 12*b* is folded onto optical axis C using folding means in the form of a folding mirror or right-angle prism 19 and the reflective plane of beamsplitter 18 substantially as showing in the drawing. A glass compensating block 20 of appropriate thickness may be inserted between lens 12*b* and prism 19 to ensure identical optical path lengths for light rays 5*a* and 5*b*.

The images 4*a* and 4*b* are therefore combined by beamsplitter 18 to form a single image 4*a*, 4*b* on the imaging plane of reticle 14 as observed by observer O.

If optical display device 2 is in proper optical alignment, then images 4*a* and 4*b* will superimpose on each other at reticle 14 and appear to observer O as a single, well-defined image 4*a*, 4*b*. Misalignment of display device 2 may be easily detected since the image produced at reticle 14 would appear as a double or diffuse image consistent with the degree of misalignment. Alignment of display device 2 using the alignment device of this invention may then be perfected by suitably adjusting display device 2 until a distinct, single image 4*a*, 4*b* is observed on reticle 14.

The supporting structure 13 may desirably include means, shown schematically in the accompanying drawing as adjustable connector 21 interconnecting apertures 11*a, b,* lenses 12*a, b,* and prisms 16 and 19, to adjust the spacing between lenses 12*a, b* and apertures 11*a, b* to accommodate a wide range of exit pupils 3*a,* 3*b* spacings of various binocular display devices 2.

It is instructive to note that the system of the present invention could be configured so that the entire optical system can be inverted, such that an alignment determination for display device 2 first made with lenses 12*a* and 12*b* near, respectively, exit pupils 3*a* and 3*b,* may be checked by inverting the alignment device so that aperture 11*a* confronts exit pupil 3*b* and aperture 11*b* confronts exit pupil 3*a,* and then rechecking the alignment of display device 2.

The optical alignment device of the present invention may also be used to assess the divergence or convergence of a single exit pupil display designed to be observed by both eyes of an observer simultaneously, such as a head-up display. For this application, a determination of the degree of disparity is made from the image on the reticle comprising the two images of the display as transmitted through the device.

The present invention, as hereinabove described, therefore provides a novel optical device for detecting misalignment in binocular displays. It is understood that certain modifications to the invention as described may be made, as might occur to one with skill in the applicable field, within the intended scope of the appended claims. Therefore, all optical component arrangements contemplated hereunder which achieve the objects of the present invention have not been shown in complete detail. Other embodiments may be developed without departing from the spirit of this invention or from the scope of the appended claims.

I claim:

1. A method for detecting misalignment in a binocular display system having first and second optical axes, which comprises the steps of:

a. forming identical first and second images transmitted, respectively, along said first and second optical axes from said binocular display system;

b. forming a composite image of said first and second images by projecting said first and second images along respective optical paths of identical optical lengths and optically folding said first image onto said second image and projecting said composite image along a third optical axis;

c. providing means defining an imaging plane along said third optical axis for displaying said composite image;

d. displaying said composite image on said imaging plane; and e. comparing said first and second images in said composite image as displayed on said imaging plane defining means to detect misalignment of said first and second images.

2. The method as recited in claim 1 wherein the step of forming said composite image is performed by folding said first and second images along said third optical axis utilizing first and second folding mirrored surfaces disposed, respectively, along said first and second optical axes, a third folding mirrored surface disposed along said third optical axis and in optical alignment with said first mirrored surface, and a beamsplitter disposed along said third optical axis and in optical alignment with said second and third mirrored surfaces.

3. The method as recited in claim 2 wherein said mirrored surfaces utilized in said step of forming said composite image comprise the reflective surfaces of right-angle prisms and wherein an optical path length compensating block is disposed along said second optical axis.

4. The method as recited in claim 2 including first and second objective lenses disposed, respectively, along said first and second optical axes, and first and second aperture defining means adjacent respective said first and second objective lenses and between said objective lenses and said binocular display system, for forming said first and second images.

5. The method as recited in claim 4 including adjusting means, interconnecting said aperture defining means, objective lenses and folding mirrored surfaces, for selectively aligning said objective lenses along respective said first and second optical axes.

6. The method as recited in claim 1 wherein said imaging plane defining means comprises a reticle for displaying said composite image, and wherein an eyepiece is included for viewing said composite image displayed on said reticle.

* * * * *